C. M. BROWN.
BRICK-MOLDS.

No. 183,533. Patented Oct. 24, 1876.

Witnesses: Inventor:
D. W. Davis Charles M. Brown
Benjamin Bakett

UNITED STATES PATENT OFFICE.

CHARLES M. BROWN, OF PEEKSKILL, NEW YORK.

IMPROVEMENT IN BRICK-MOLDS.

Specification forming part of Letters Patent No. 183,533, dated October 24, 1876; application filed April 15, 1876.

*To all whom it may concern:*

Be it known that I, CHARLES M. BROWN, of Peekskill, New York, have invented an Improvement in the Construction of Brick-Molds, of which the following is a specification:

My invention relates to the manner of constructing the iron facing of brick-molds, and the object is to render the molds stronger and more durable than those heretofore in use, without increasing materially the cost of construction.

Figure 1:
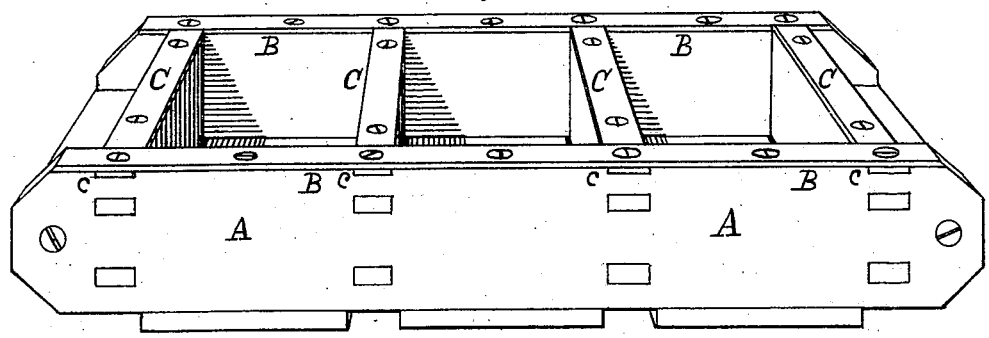
Figure 2:
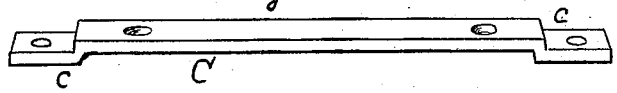
Figure 3:
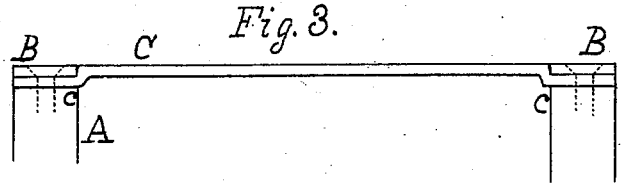
Figure 4:
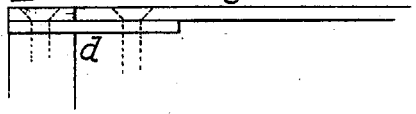

In the drawings, Figures 1 and 2 are perspective views, and Figs. 3 and 4 are sectional views, of the parts of a mold essential to illustrate my invention.

Fig. 1 represents a mold constructed after my method. It presents the appearance of the ordinary mold, and differs from it only in the form and manner of attaching the metal facing of the transverse partition C.

In the ordinary method of applying the facing, the long strips B are attached as in the drawing, and the transverse strips C are made just long enough to cover the partition, and, being entirely independent of the longitudinal strips, add nothing to the strength of the mold.

My invention consists in making the strips C long enough to pass entirely across the width of the mold and under the strips B, and that the upper surfaces of the strips may be flush with each other I bend the ends of the cross-strips C into the shape shown in Fig. 2; or the pieces C may be left straight and depressions be formed in the strip B to receive them, though it is not as convenient nor as strong as the former method. The strips are secured to the mold by screws, one of which is made to pass through both strips at their point of intersection *c*, as shown in Fig. 3. Thus made, the mold is very strong and durable.

Fig. 4 shows another method for preserving the continuity of the strip C in a measure; but it does not make as strong and simple union as the method previously described.

I claim—

The transverse strips C C, extending entirely across the mold, and having their ends formed with the offsets *c c*, that they may lie under the side strips B B, substantially as shown, and for the purposes described.

CHARLES M. BROWN.

Witnesses:
D. W. TRAVIS,
BENJAMIN BASSETT.